United States Patent [19]

Uemura et al.

[11] Patent Number: 4,844,922

[45] Date of Patent: Jul. 4, 1989

[54] LOW FAT FOODS

[75] Inventors: Isao Uemura; Mitsuhiro Ishihata, both of Oizumimachi, Japan

[73] Assignee: Ajinomoto Co., Inc., Japan

[21] Appl. No.: 848,192

[22] Filed: Apr. 4, 1986

[30] Foreign Application Priority Data

Apr. 4, 1985 [JP] Japan .................................. 60-71570

[51] Int. Cl.⁴ ............................................ A25L 1/317
[52] U.S. Cl. .................................... 426/104; 426/574;
 426/575; 426/576; 426/577; 426/646; 426/804
[58] Field of Search ............... 426/574, 573, 804, 417,
 426/646, 104, 576, 575, 577

[56] References Cited

U.S. PATENT DOCUMENTS

| | | | |
|---|---|---|---|
| 3,658,550 | 4/1972 | Hawley | 426/575 |
| 3,919,435 | 11/1975 | Feldbrugge et al. | 426/574 |
| 4,089,981 | 5/1978 | Richardson | 426/574 |
| 4,098,913 | 7/1978 | Baugher | 426/104 |
| 4,324,807 | 4/1982 | Kim et al. | 426/646 |
| 4,361,590 | 11/1982 | Wojcik | 426/417 |
| 4,596,715 | 6/1986 | Ballard et al. | 426/573 |

*Primary Examiner*—Donald E. Czaja
*Assistant Examiner*—Mary S. Mims
*Attorney, Agent, or Firm*—Sughrue, Mion, Zinn, Macpeak & Seas

[57] ABSTRACT

A low-fat food with decreased amounts of animal fat or other types of fat containing a hot-melt type gal dispersed in the food tissue, wherein the amount of the gel to the food tissue at temperature below the melting point of the gel is in the range of about 1 to about 25 weight percent. These low-fat foods with low caloric and cholesterol levels have a juicy and heterogeneous mouthfeel like that of high-fat foods because the gel contained melts during cooking, giving moderately thick texture and agreeable taste.

6 Claims, No Drawings

LOW FAT FOODS

FIELD OF THE INVENTION

This invention relates to foods containing animal fat or other types of fat, such as processed livestock products. More particularly, it relates to highly palatable, low-fat foods which contain decreased amounts of animal fat or other types of fat and which have much the same texture as original high-fat foods.

BACKGROUND OF THE INVENTION

There has been a demand for low-calorie and low-fat foods in order to prevent obesity, geriatric diseases and similar troubles caused by excessively high caloric intake and accumulation of cholesterol. Fats of animal origin, in particular, contribute a great deal to the increase in caloric and cholesterol level. Hence, reducing the content of animal fat in foods would be very effective in diminishing obesity, geriatric diseases and similar troubles.

Attempts to lower the fat content in foods have so far been concentrated principally on those foods which are composed mainly of fat and oil (e.g., spreads, cream and margarine) and on defatting of special foods, such as nuts, fish meal and some dairy products. In ordinary foods, however, little effort has been devoted toward deliberately diminishing fatty components that are hazardous to health and toward making up for the loss in sensory and physical properties, unlike efforts directed toward production of low-salt and low-sugar foods.

Take, for example, foods made of minced meat (a food material relatively rich in fat), such as hamburgers, shaomais and meat loaves. In this case, if minced meat from which fat has been previously removed is used as the meat material, the resultig processed foods are dry, firm and crumbly in texture and monotonous in taste, lacking the juicy feel characteristics of meat products. Vegetables and other food materials are generally added to minimize such deterioration in mouthfeel and taste. However, it is quite impossible to achieve satisfactory taste and texture comparable with ordinary foods containing sufficient amounts of fat and oil.

SUMMARY OF THE INVENTION

An object of this invention is to provide highly palatable, low-fat foods which contain decreased amounts of animal fat or other types of fat and which have much the same taste and texture as original high-fat foods.

Assiduous studies aimed at improving the sensory characteristics of low-fat foods have led to the discovery that this object is achieved if a suitable hot-melt type gel is dispersed in the food tissue in place of the fat removed. This invention was accomplished based on these findings.

Thus, this invention provides a low-fat food with a decreased amount of animal fat or other types of fat contained therein, comprising a hot-melt type gel dispersed in the food tissue where the amount of the hot-melt type gel to the food tissue at temperatures below the melting point of the gel is in the range from about 1 to about 25 weight percent.

DETAILED DESCRIPTION OF THE INVENTION

The gel used in the low-fat foods of this invention is now-oleaginous and must be one which melts or liquifies at cooking temperatures or lower. Illustrative examples are those gels which contain at least one gelling agent selected from gelatin, agar, carrageenan, pectin, polysaccharides, farcellulane and cardlane type polysaccharides, or combinations of two or more of these materials, such as xanthan gum and tamarind gum. Of these, the most preferred are gels having a melting point near that of animal fat, such as the melting point of beef tallow and lard, and showing similar melting behavior (for example, a gelatin gel). A suitable melting point for the gel can range from about 10° C. to about 100° C., preferably about 60° C. or lower.

A thickening agent (e.g., gums such as xanthan gum, guar gum and tamarind gum, carrageenan, crystalline cellulose such as carboxymethyl cellulose (CMC, e.g., AVICEL, produced by FMC Corp.) and starch), if added to the gel, gives a thick texture like that of fat, thereby giving the final products sensory characteristics closer to those of the original high-fat foods. When certain gelling agents are used, for example, a combination of xanthan gum and tamarind gum, a thickening agent is not generally employed.

The strength of the gel should be such that it is well adapted to the molding operation during food processing and that it can be dispersed in the food tissue in a form similar to that of the fat dispersed in the original high-fat foods. To be more specific, its gel strength should preferably be in the range of about 100 to about 400 $g/cm^2$.

The gel can be prepared by dissolving or dispersing a gelling agent and, as required, a thickening agent in water, followed by solidification by cooling. It is preferable to also add flavorings, spices, sodium chloride, potassium chloride, sugars, organic acids and other additives to the gel. Examples of these materials include: glutamic acid, other amino acids and salts thereof, protein hydrolyzates (hydrolyzed amino protein (HAP), hydrolyzed vegetable protein (HVP), yeast extract, meat essence, sea food extract, vegetable extract, meat flavorings, fat flavorings, pepper, garlic, nutmeg, laurel, thyme and clove.

The optimum amount of gel to be added may differ depending on the properties of the main material that constitutes the body of food under consideration, the desired texture of the final product, and the quantity of fat or oil removed, but generally is in the range of about 1 to about 25 weight percent of the food at temperatures below the melting point of the gel (that is, when it is added in the form of gel). The greater the amount added, the greater will be the juicy feel of the final product; however, an excessive amount may result in the final product having a watery impression. If the amount of the gel is too small, on the other hand, the intended sensory characteristics cannot be obtained. A preferable amount, therefore, lies between about 1 to about 25% based on the weight of food, most preferably in the range of 4 to 15 weight percent.

There is no limitation upon the type of foods to which this invention can be applied, but the present invention is in particular applicable to the production of processed minced meat products, such as hamburgers, shaomai, gyoza (dumplings stuffed with minced pork) and meatballs. No limitation also exists on the fat content in the low-fat foods of this invention, but the outstanding effects of this invention can be achieved, when the original fat level in the product is reduced to below about 10 weight percent or lower, preferably below 5 weight percent.

The gel may be admixed in any desired way so long as it can be dispersed as intended in the food tissue. Typical dispersion methods include:

(1) Mixing a minced gel with the food material to be treated.

(2) Rolling up sheets of the gel in the food material to be treated, or sandwiching them between layers of the food material to be treated.

(3) Mixing the gel and the food material to be treated in a mixer having chopping function, such as a food cutter.

Of these, method (1) is most advantageous for processed minced meat products. The best result can be obtained in this case when the gel is chopped to an average size of about 0.1 to 3 times the size of the minced meat particles.

The low-fat foods of this invention have a juicy and excellent mouthfeel like that of high-fat foods because the gel present melts during cooking, giving a moderately thick texture and an agreeable taste. The combination of decreased amount of fat and oil (that is, low caloric and cholesterol levels) with favorable sensory characteristics makes the low-fat foods of this invention excellent health foods.

The following examples are given to illustrate the present invention in greater detail. However, these examples are not to be construed as limiting the present invention. Unless otherwise indicated, all parts, percents, ratios and the like are by weight.

TABLE 1

|  | Example 1 | | |
|---|---|---|---|
|  | Control A (Kg) | Control B (Kg) | Food Product of This Invention (Kg) |
| Pork (fat content: 20%) | 6.0 | — | — |
| Pork (fat content: 8%) | — | 6.0 | 6.0 |
| Unskinned Chicken | 4.0 | — | — |
| Boneless Chicken | — | 4.0 | 4.0 |
| Onion (finely cut) | 3.0 | 3 | 3 |
| Albumin | 1.0 | 1 | 1 |
| Starch | 1.0 | 1 | 1 |
| Seasoning | 0.6 | 0.6 | 0.6 |
| Spice | 0.04 | 0.04 | 0.04 |
| Gel | — | — | 1.0 |

The gel used was prepared as follows:
Gelatin: 45 g
Seasoning: 10 g
Water: 945 g This mixture was heated to 70° C. and then allowed to cool, forming the gel. The mechanical strength of the gel was 234 g/cm² (7 mmo spherical plunger; compression speed: 2 cm/min).

Using the formulations given in Table 1 above, chopped meat, finely cut gel (for the food product of this invention) and other materials as listed in Table 1 were intimately mixed in a mixer, the mixture was shaped into dumplings. Each piece was then covered with a shaomai dough, steamed and then frozen at −35° C. (air blast), to produce frozen shaomais.

Sensory evaluation of these foods was conducted with thirteen taste panelists and the results obtained are summarized in Table 2 below.

TABLE 2

| Sensory Evaluation | Control A | Control B | Food Product of This Invention |
|---|---|---|---|
| Fat Content | 12.3% | 4.6% | 4.4% |
| Color of Contents | Slightly whitish 3.4 | Flesh-colored; favorable 4.1 | Flesh-colored; favorable 4.1 |

TABLE 2-continued

| Sensory Evaluation | Control A | Control B | Food Product of This Invention |
|---|---|---|---|
| Surface Luster | Sufficient 4.0 | No luster 3.1 | Slight 3.8 |
| Taste and Flavor | Favorable 4.2 | Favorable 4.1 | Favorable 4.2 |
| Greasiness | Slightly greasy 3.5 | Crumbly 2.5 | Not greasy 4.0 |
| Juicy Feel | Heterogeneous, juicy 4.0 | Crumbly 2.5 | Herterogeneous, juicy 4.1 |
| Firmness | Moderately soft 4.1 | Firm 2.5 | Moderately soft 4.0 |
| Texture in General | 3.9 | Tough 2.5 | Easy to eat 4.1 |
| Overall Rating | 3.9 | 3.0 | 4.0 |

As is apparent from the results in Table 2, the Control B food product which contained less fat had a firm texture lacking a juicy mouthfeel, while the food product of this invention (with a gel added to the Control B food product) provided to be a favorable product which combined low fat level and markedly improved texture.

Each sensory item was evaluated using a 5-grade rating method: Good (5); Fair (4); Hard to say which (3); Slight poor (2); and Poor (1).

TABLE 3

|  | Example 2 | | |
|---|---|---|---|
|  | Control A (g) | Control B (g) | Food Product of This Invention (g) |
| Shrimp | 270 | 270 | 270 |
| Ground Fish | 250 | 250 | 250 |
| Lard | 130 | — | — |
| Onion | 200 | 200 | 200 |
| Starch | 90 | 90 | 90 |
| Albumen | 20 | 20 | 20 |
| Seasoning | 50 | 50 | 50 |
| Gel | — | — | 120 |

Preparation of gel:
Gelatin: 40 g
Seasoning: 10 g
Xanthan Gum: 15 g
Water: 935 g The gel was prepared in the same manner as described in Example 1 using the materials given above.

According to the formulations given in Table 3 above, ground fish, lard, finely cut onion, granulated gel (for the food product of this invention) and other materials as listed were intimately mixed in a food cutter, the mixture was shaped into a filling for dumplings, and each piece was covered with a shaomai dough, steamed and then frozen as described in Example 1 making frozen shaomais.

Sensory evaluation of these foods was conducted with ten well-trained taste panelists according to the profile method. The results obtained are summarized in Table 4 below.

TABLE 4

| Control A | Control B | Food Product of This Invention |
|---|---|---|
| Heterogeneous in | Testure like boiled | Soft and hetero- |

TABLE 4-continued

| | Control A | Control B | Food Product of This Invention |
|---|---|---|---|
| | structure, giving moderately soft and resilient feel. Juicy feel. | fish paste, lacking juicy feel and mouthfeel of shrimp. | geneous mouthfeel (feel of shrimp well noted). Juicy feel. Plain taste and texture |
| Point out of 10 | 7.5 | 6.1 | 8.1 |

TABLE 5

| | Example 3 | |
|---|---|---|
| | Control (Kg) | Food Product of This Invention (Kg) |
| Beef (fat content: 14%) | 1.00 | 1.00 |
| Pork (fat content: 20%) | 2.00 | — |
| Pork (fat content: 8%) | — | 1.76 |
| Plant Protein | 0.30 | 0.30 |
| Onion (finely cut) | 1.00 | 1.00 |
| Flour | 0.24 | 0.24 |
| Egg | 0.30 | 0.30 |
| Seasoning | 0.16 | 0.16 |
| Spice | 0.012 | 0.012 |
| Gel (finely cut) | — | 0.24 |

The gel was prepared as follows:
Carrageenan (20 g) was added to 800 ml of soup, and the mixture was heated and then allowed to cool, forming the gel.

According to the formulations given in Table 5 above, chopped meat and the other materials listed in Table 5 above were intimately mixed in a mixer, the mixture was shaped into oval dumplings, and each piece was frozen, covered with coatings, and then frozen once again, making frozen minced cutlets.

The cutlets produced were fried, and the fried products were subjected to sensory evaluation by twelve taste panelists. Significantly higher marks were scored for the food product of this invention in terms of juicy feel, texture and overall evaluation.

While the invention has been described in detail and with reference to specific embodiments thereof, various changes and modifications can be made therein without departing from the spirit and scope thereof.

What is claimed is:

1. A low-fat minced meat food comprising a food with decreased amounts of animal fat or other types of fat contained therein, wherein a non-oleaginous hot-melt gas is dispersed in a low-fat minced meat and wherein the amount of said hot-melt gel at temperatures below the melting point thereof, to the minced meat, is in the range from about 1 to about 25% by weight and the hot-melt gel has an average particle size of about 0.1 to about 3 times the particle size of the particles of minced meat.

2. The low-fat minced meat food as claimed in claim 1, wherein said hot-melt gel contains at least one gelling agent selected from the group consisting of gelatin, agar, carrageenan, pectin, gums, farcellulane polysaccharides, cardlane polysaccharides and mixtures thereof.

3. The low-fat minced meat food as claimed in claim 1, wherein said hot-melt gel has a melting point in the range from about 10° C. to about 100° C.

4. The low-fat minced meat food as claimed in claim 1, wherein said hot-melt gel further contains a thickening agent.

5. The low-fat minced meat food as claimed in claim 4, wherein said thickening agent is at least one member selected from the group consisting of xanthan gum, tamarind gum, carrageenan, pectin, crystalline cellulose, starch and mixtures thereof.

6. The low-fat minced meat food as claimed in claim 1, wherein the content of said animal fat or other types of fat is about 10 weight % or lower.

* * * * *